United States Patent [19]

Kuranami

[11] Patent Number: 5,584,534
[45] Date of Patent: Dec. 17, 1996

[54] SEAT FOR DISABLED PERSON

[75] Inventor: Shunji Kuranami, Kamakura, Japan

[73] Assignee: Koito Industries Limited, Kanagawa, Japan

[21] Appl. No.: 256,544
[22] PCT Filed: Nov. 16, 1993
[86] PCT No.: PCT/JP93/01679
§ 371 Date: Oct. 19, 1994
§ 102(e) Date: Oct. 19, 1994
[87] PCT Pub. No.: WO94/11247
PCT Pub. Date: May 26, 1994

[30] Foreign Application Priority Data

Nov. 16, 1992 [JP] Japan .................................. 4-331071
Nov. 26, 1992 [JP] Japan .................................. 4-339742

[51] Int. Cl.$^6$ ................................................. A47C 7/54
[52] U.S. Cl. ..................... 297/411.32; 297/145
[58] Field of Search .................. 297/411.32, 411.34, 297/411.36, 411.3, 145

[56] References Cited

U.S. PATENT DOCUMENTS 3,632,161  1/1972  Arfaras ............................ 297/145
4,176,878 12/1979  Koutsky ................... 297/411.32 X
4,902,072  2/1990  Chancellor ................. 297/411.32

FOREIGN PATENT DOCUMENTS 2144256  6/1990  Japan ...................................... 297/145

Primary Examiner—Laurie K. Cranmer
Attorney, Agent, or Firm—Sughrue, Mion, Zinn, Macpeak & Seas

[57] ABSTRACT

A seat having a movable armrest which is retractable to a lowermost position so that a user can obtain greater access to the seat. In a first embodiment, a horizontal shaft pivotably supports a rear portion of the armrest to allow the forward portion of the armrest to be pivoted downwardly. When the armrest is in the unretracted position, a locking device is provided for firmly locking the forward portion of the armrest to the seat frame. In the second embodiment of the invention, a pair of rails are secured to the frame of the seat and a pair of guides are respectively secured to the forward and rear portions of the armrest. The guides are respectively received in the rails to allow the rails to be translated downwardly to allow greater access to the seat. When the armrest is in the unretracted position, the guides are secured to the rails so that the armrest is retained firmly in place.

9 Claims, 8 Drawing Sheets

SEAT FOR DISABLED PERSON

TECHNICAL FIELD

The present invention relates to a vehicular seat for a disabled person wherein, in order that a disabled person can easily sit on or separate from a seat which is used for various vehicles such as an airplane, ship or rolling stock, the front side or the whole of an armrest formed on the walkway side of the seat is turned in the vertical direction, to thereby temporarily shift the armrest from the position of obstructing the sitting or separating action on or from the seat.

BACKGROUND ART

In seats for vehicles such as an airplane, ship and rolling stock, except for the seats in the first class or business class passenger cabins, such armrests as to be fixed on the side portions of the seats have been generally used. Further, in the first class seat having a wide seat pitch, a wheelchair is accessible to the front of the seat, so that a disabled person can relatively easily move on the seat from the front of the seat and sit on the seat; however, in the economy class or business class seat, the seat pitch is narrow and thereby the wheelchair cannot be moved to be close to the front of the seat, so that the disabled person must sit on or separate from the seat while leaving the wheelchair on the walkway side of the seat, which causes a problem that the armrest obstructs the sitting or separating action on or from the seat. To cope with this problem, there has been proposed a vehicular seat having the so-called jumping type armrest capable of vertically turning the front side of the armrest for allowing a disabled person to sit on or separate from the seat therethrough. However, in this construction, even when a stay for supporting the front side of the armrest is provided, the strength or the supporting force of the armrest in the normal service is weak, to thus lower the reliability and durability.

For seats disposed at the front row of an airplane even in the first class, or for seats in the business class, the so-called armrest with a wing capable of containing a table in a wing constituting the armrest is used. Further, in seats for the first class, all the seats include armrests with wings capable of containing tables in the wings. Even for the seat having the above armrest with a wing, there has been required such a structure that the armrest can be shifted from the side end portion of the seat for allowing a disabled person to easily sit on or separate from the seat from the walkway side.

Taking the above problem into consideration, the present invention has been made, and its object is to provide a vehicular seat wherein, even for an armrest with a wing capable of containing a table in a wing, the armrest can be shifted from the side end portion of the seat for allowing a disabled person to easily sit on or separate from the seat.

SUMMARY OF THE INVENTION

A seat for a disabled person according to the present invention has the following subject matter: namely, the front side of an armrest, which is provided on the side end portion of a seat in such a manner as to contain a table therein and which is formed on the end portion on the walkway side of the seat, is mounted in such a manner as to be turned around a horizontal shaft formed on the rear portion of the armrest to be thus tunable in the vertical direction, or the armrest is mounted in such a manner as to be vertically movable along rails provided on a seat frame in the vertical direction; and a locking device capable of suitable locking the armrest with respect to the seat frame and releasing the locking is provided.

With the above construction, when the locking of the locking device is released, the front side of the armrest is turned around the rotational shaft, or sunk along the rails, and thereby it can be shifted downward. Accordingly, even for the armrest with a wing capable of containing a table in a wing, the armrest can be shifted so as to be sunk down from the side end portion of the seat. As a result, as compared with the case that the armrest is jumped upward just as in the prior art seat, it is possible to form a sufficient side space of the seat-bottom for the sitting or separating action on or from the seat, which allows a disabled person to easily sit on or separate from the seat from the walkway side of the seat.

DESCRIPTION OF THE PREFERRED EMBODIMENTS

Figure 1:
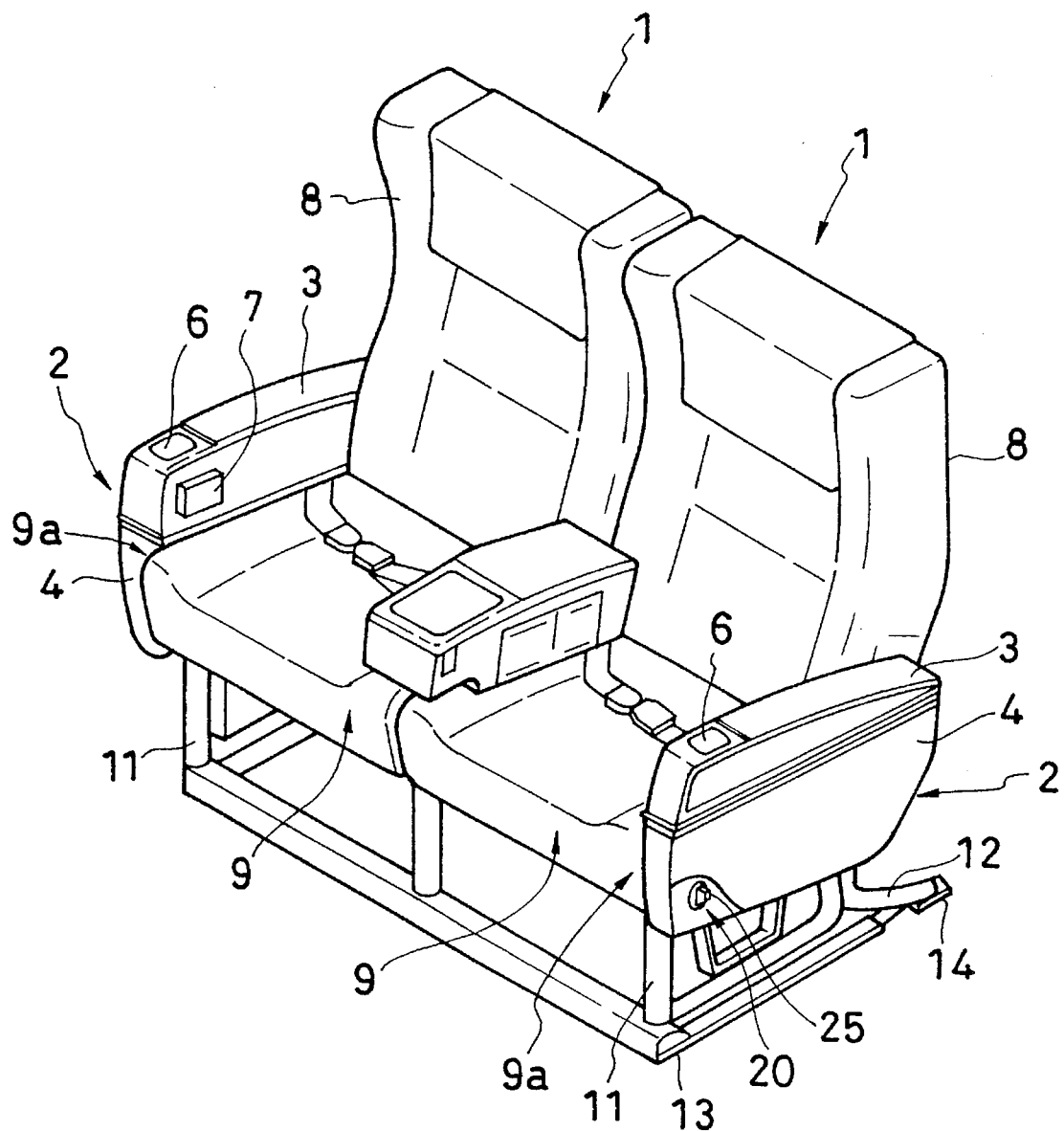
FIG. 1 is a whole perspective view showing a first embodiment of a seat for a disabled person according to the present invention.

Hereinafter, a first embodiment of a seat for a disabled person according to the present invention will be described with reference to FIGS. 1 to 7. The seat for a disabled person according to this embodiment is mounted to be disposed in a passenger cabin of an airplane. In the example shown in the figures, as shown in the whole view of FIG. 1, a plurality of seats 1 and 1 are articulated to constitute a set of seats for two passengers or three passengers. An armrest 2 is provided on one side end portion, that is, on the walkway side of the seat 1. The armrest 2 comprises the so-called armrest with a wing which can contain a table 5 in a wing 4 by opening upward an arm cap 3 formed on the upper surface of the armrest 2. Further, an ashtray 6 is provided on the armrest 2 in front of the arm cap 3. Additionally, a PCU (Printed Circuit Unit) 7, which includes operating buttons for adjusting the sound-volume of an earphone or switching channels, is provided on the inner surface of the seat side of the wing 4.

A base frame tube 10 adapted to form a seat frame for supporting a seat-back 8, a seat-bottom 9 and the like is supported by a front leg 11 and a rear leg 12. The lower ends of the front leg 11 and the rear leg 12 are fixed on a rail R disposed on the floor side by means of mounting fixtures 13 and 14, respectively. In addition, a shock absorber 15 is interposed between the front leg 11 and the rear leg 12 for absorbing the shock load applied to the seat in the case of emergency. The above armrest 2 is usually supported on the end portion of the base frame tube 10 by means of a stay 17 which is fixed on the lower surface of an armrest frame 16 forming the above armrest so as to extend downward therefrom. Further, the armrest 2 is fixed to be turned vertically with respect to the seat frame by a horizontal rotational shaft 18 provided at a slightly higher position on the rear portion of the armrest 2. Additionally, the outer surface of the armrest 2 is covered by an armrest cover 19.

The connection of the stay 17 to the base frame tube 10 is performed by a locking device 20 enabling the locking and the releasing of the locking. Namely, a sleeve 21, which is positioned coaxially with the base frame tube 10 in the normal state, is provided at the lower end of the stay 17 for connecting and supporting the armrest 2 with respect to the base frame tube 10. Further, a column-like sliding shaft 22 being slidable both in the sleeve 21 and in the base frame tube 10 is disposed, and which can be removably inserted in the base frame tube 10. Additionally, a pair of guide pins 23 are formed around the outer peripheral surface of the sliding shaft 22 so as to oppositely project in the diameter direction, and substantially inverse U-shaped guide grooves 24 for inserting the guide pins 23 therethrough are formed around the cylindrical wall of the sleeve 21 in which the sliding shaft 22 is turnably fitted. Each of the guide pins 23 is movable along the formation direction of the guide groove 24 in such a state as to be inserted in the guide groove 24. Accordingly, by rotation of the sliding 22 around its axis, the guide pins 23 projectingly provided around the outer peripheral surface of the sliding shaft 22 at both the ends in the diameter direction are each operated to be engaged with or disengaged from the U-shaped terminals 24a or 24c of the guide grooves 24.

A knob 25 is provided on the axial outer end portion of the sliding shaft 22, so that a passenger or a crewman holds the knob 25, and can turn the sliding shaft 22 along the guide groove grooves 24 and simultaneously push or pull it in the axial direction. By pulling or pushing of the knob 25, the sliding shaft 22 and the guide pins 23 projectingly provided around the sliding shaft 22 are moved in the longitudinal direction, that is, in the axial direction along central portions 24b of the U-shaped guide grooves 24, so that the sliding shaft 22 can be removed from or fitted in the base frame tube 10. The central portion 24b of the guide groove 24 is formed in such a length that the sliding shaft 22 can be sufficiently fitted in or removed from the base frame tube 10 (see FIG. 7).

Figure 2:
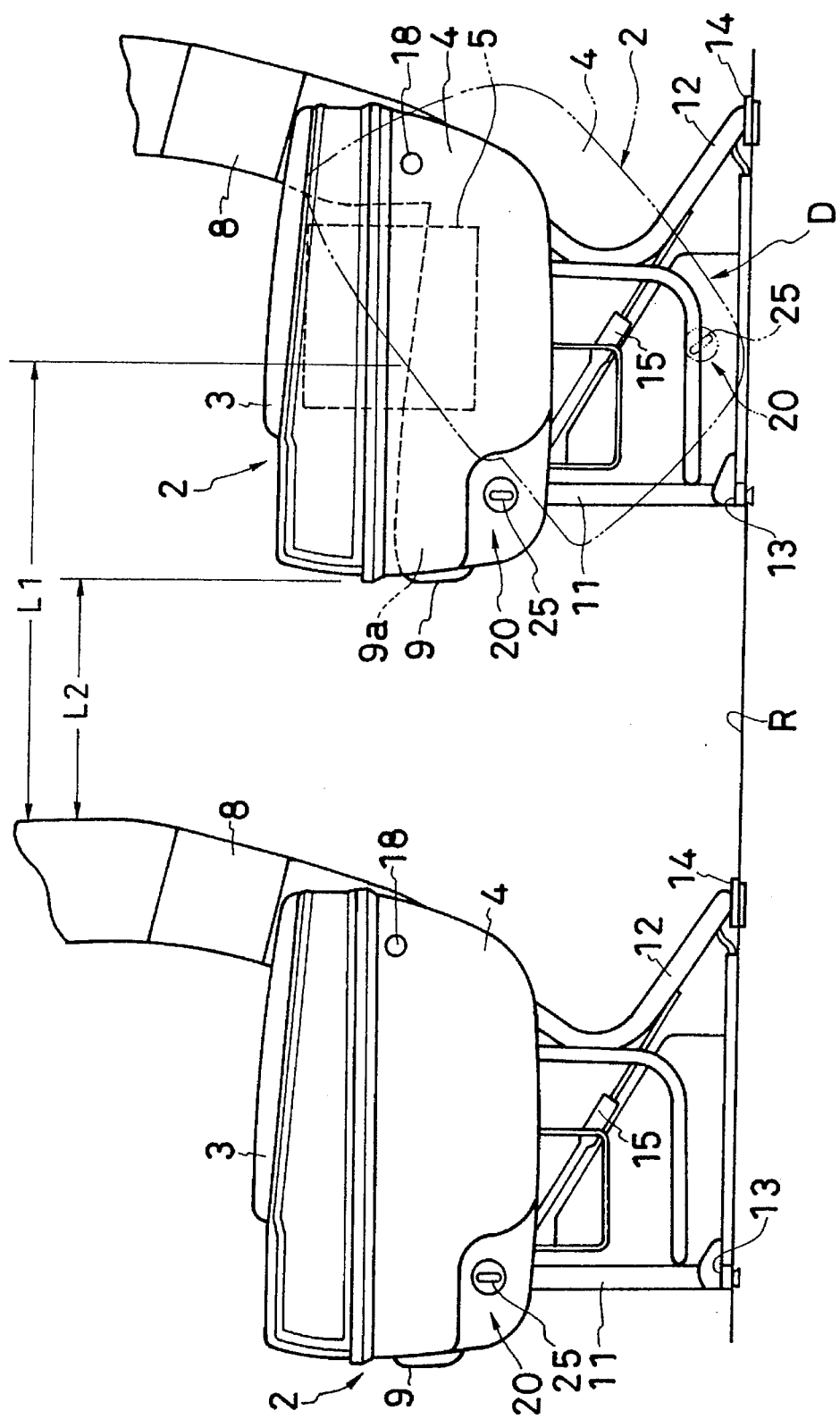
FIG. 2 is an enlarged side view showing such a state that the seats of FIG. 1 are arranged in the longitudinal direction.
Figure 3:
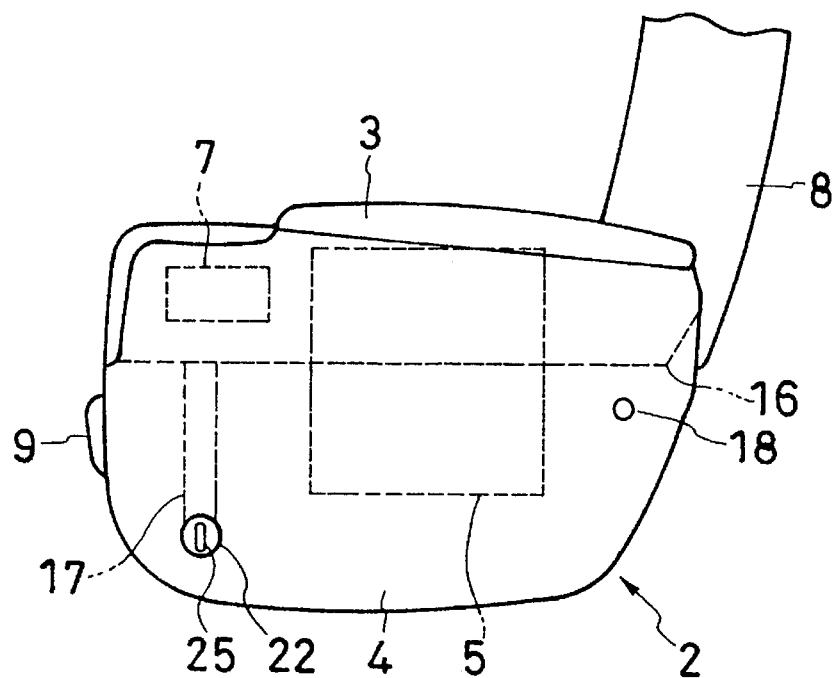
FIG. 3 is a side view showing main parts of FIG. 2.
Figure 4:
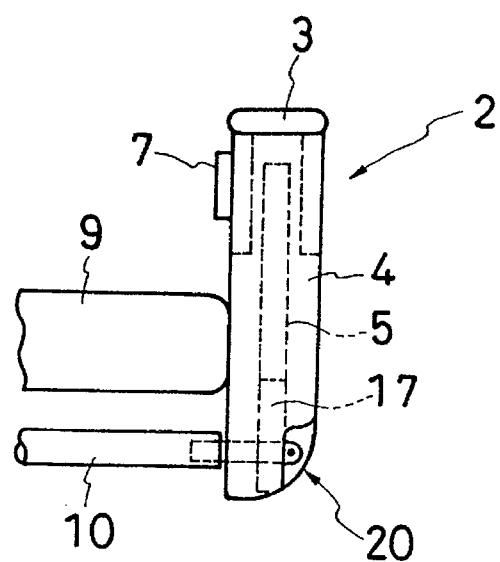
FIG. 4 is a front view showing main parts of FIG. 3.
Figure 5:
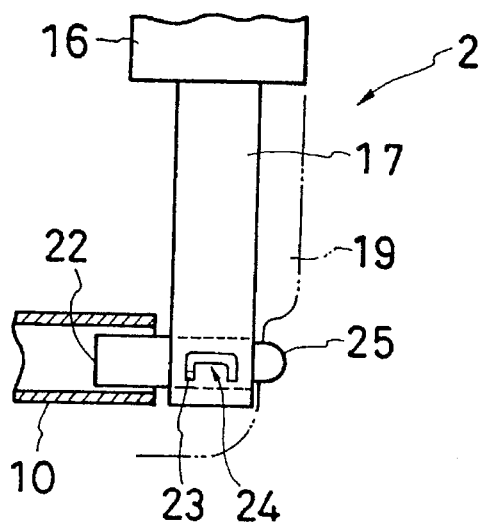
FIG. 5 is an enlarged view of main parts of FIG. 4, with parts partially cut-out.
Figure 6:
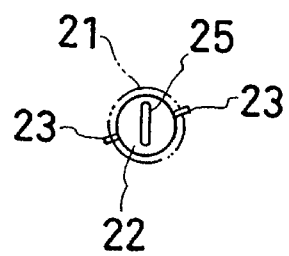
FIG. 6 is a side view showing main parts of FIG. 5.
Figure 7:
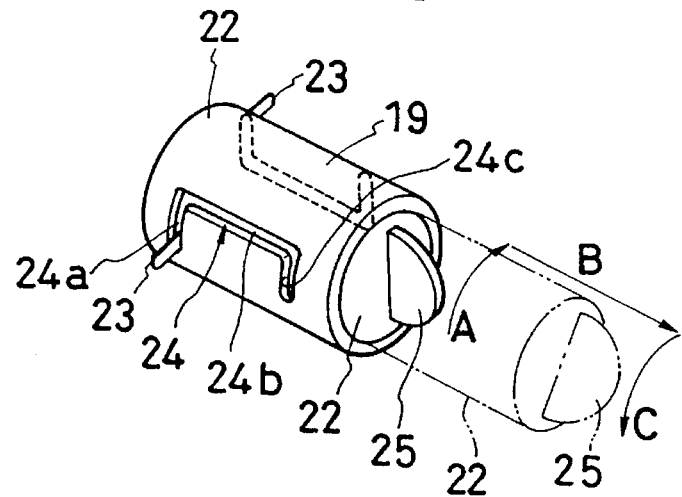
FIG. 7 is an enlarged perspective view showing main parts of FIG. 5.

In the seat for a disabled person according to this embodiment, when a disabled person stops the wheelchair at the side of the seat to be sit on the seat, at first, he turns the knob 25 clockwise (in the direction of the arrow A) to remove the guide pins 23 from the one-sided U-shaped terminals 24a of the guide grooves 24. Then, he holds the knob 25 and pulls it on this side (in the direction of the arrow B) to move the guide pins 23 along the central portions 24b of the U-shaped guide grooves 24 for removing the sliding shaft 22 from the base frame tube 10. With this operation, the locking of the stay 17, that is, the armrest 2 to the base frame tube 10 is released, so that the armrest 2 is in such a state as to be turnable around the rotational shaft 18. Next, the disabled person moves the guide pins 23 while turning it counterclockwise to engaged the guide pins 23 with the other terminals 24c of the guide grooves 24 (in the direction of the arrow C). Thus, he can turn the armrest 2 counterclockwise by its deadweight, or pressing-down by the hand, and can sink downward the front side of the armrest 2 (the position shown as the arrow D). In such a state that the front side of the armrest 2 is moved downward, a side portion 9a of the seat-bottom 9 is sufficiently exposed, so that the disabled person can ensure the space enough to move from the wheelchair and to sit on the seat. Namely, as shown in FIG. 2, in the conventional seat type, the seat releasing dimension between the back surface of a seat-back 8 of the front seat and the armrest 2 of the rear seat is L2; however, according to thepresent invention, after the front end portion of the armrest 2 is moved downward, the seat releasing dimension between the back surface of the seat-back 8 and the armrest 2 becomes L1 (L2<L1). The dimension L1, which is enough for the disabled person to move his waist from the wheelchair to the side portion of the seat-bottom 9, can be formed on the side portion of the seat. This makes it possible to sufficiently ensure the space L1 required for the movement of the disabled person as compared with the conventional seat.

After completing the movement to sit down on the seat, the disabled person lifts up the armrest 2 and returns it to the usable position, and presses the knob 25 in the reversed direction so as to insert the sliding shaft 22 in the base frame tube 10. After that, by turning of the knob 25 in the direction reversed to the direction described-above, the guide pins 23 are engaged with the one-sided U-shaped terminals 24a of the guide grooves 24 again, thus performing locking action. As described above, according to this embodiment, the locking action of the locking device 20 is easily released to release the locking of the armrest 2 to the seat frame, so that the armrest 2 is freely turned about the rotational shaft 18. This makes it possible to largely release the side portion 9a of the seat-bottom 9, and hence to ensure a sufficient space required for the movement of the disabled person from the wheelchair to the seat. Further, even for the prior art armrest with wing being impossible to be constructed as the so-called jumping type in which the armrest is jumped upward, the side portion 9a of the seat-bottom 9 can be sufficiently exposed by the movement of the front side of the armrest 2 itself so as to be sunk downward, as a result of which the disabled person can seat on or separate from the seat even if the seat pitch is narrow.

Additionally, in order that the sliding shaaft 22 is easily inserted in the base frame tube 10 again, a spring (not shown) for biasing the sliding shaft 22 toward the inner side of the base frame tube 10 may be provided. In this case, for preventing the biased sliding shaft 22 from being caught by the other portions in such a state that the armrest 2 is turned, a guide plate (not shown) continuous from the end portion of the base frame tube 10 may be provided to guide the end portion of the insertion side of the sliding shaft 22 for allowing the sliding shaft 22 to be easily re-inserted when the armrest 2 is returned.

Further, in order that the guide pins 23 are prevented from being carelessly removed from the U-shaped terminaals 24a and 24c of the guide grooves 24 due to vibration or the like, a spring (not shown) for biasing the guide pins 23 in the circumferential direction may be provided on the sliding shaft 22. Further, although the armrest 2 is so constructed as to be turned around the rotational shaft 18, a stopper (not shown) may be provided for preventing the front side of the armrest 2 from being not excessively turned upward. In this case, the stopper is effective to position the armrest 2 when the armrest 2 is returned, and to make easy the return of the armrest 2. Further, in order that the armrest 2 can be easily turned after releasing the locking of the locking device 20, a spring (not shown) for canceling the weight of the armrest 2 may be provided.

Figure 8:
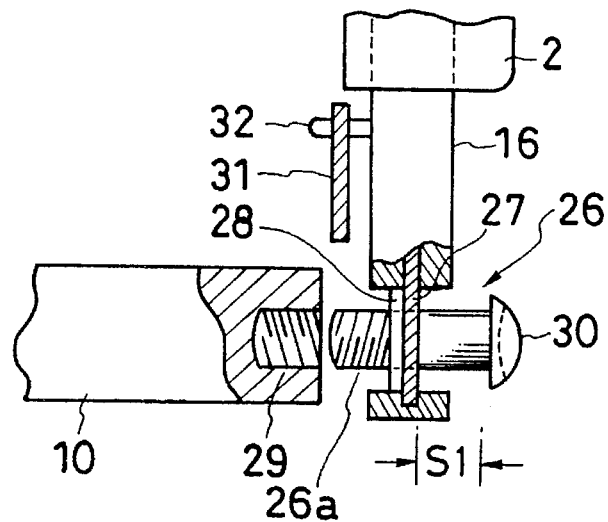
FIG. 8 is an enlarged front view of main parts of a modification of a locking device before an arm rest is locked.
Figure 9:
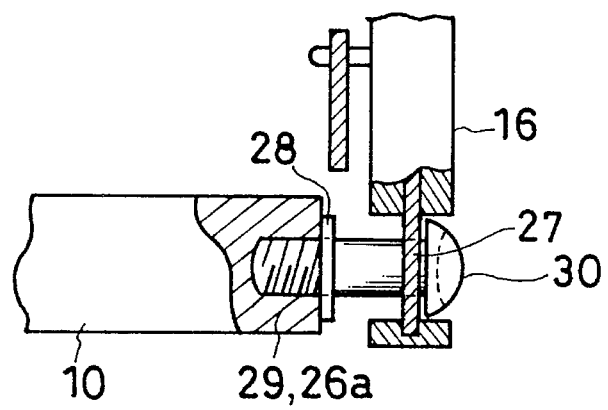
FIG. 9 is an enlarged front view of main parts of the modification of FIG. 8 after the arm rest is locked.
Figure 10:
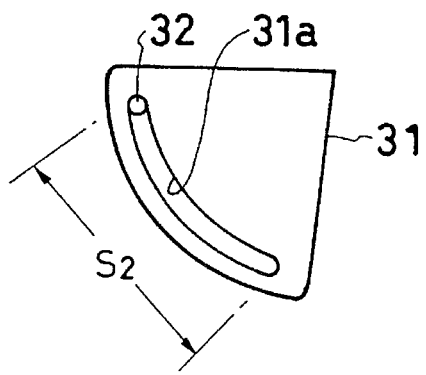
FIG. 10 is an enlarged side view showing one structure of an angle restricting plate.
Figure 11:
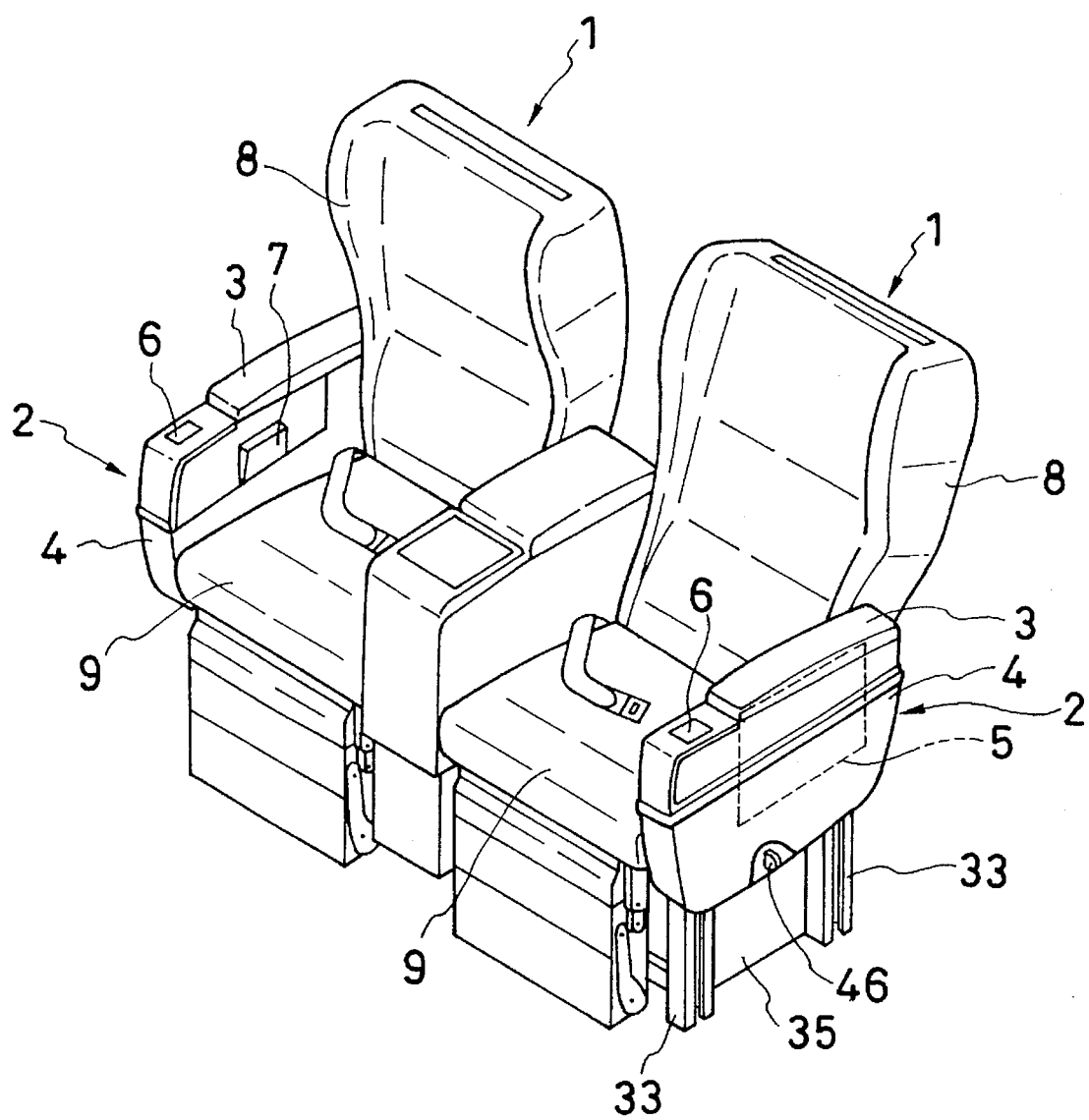
FIG. 11 is a whole perspective view showing a second embodiment of a seat for a disabled person according to the present invention.
Figure 12:
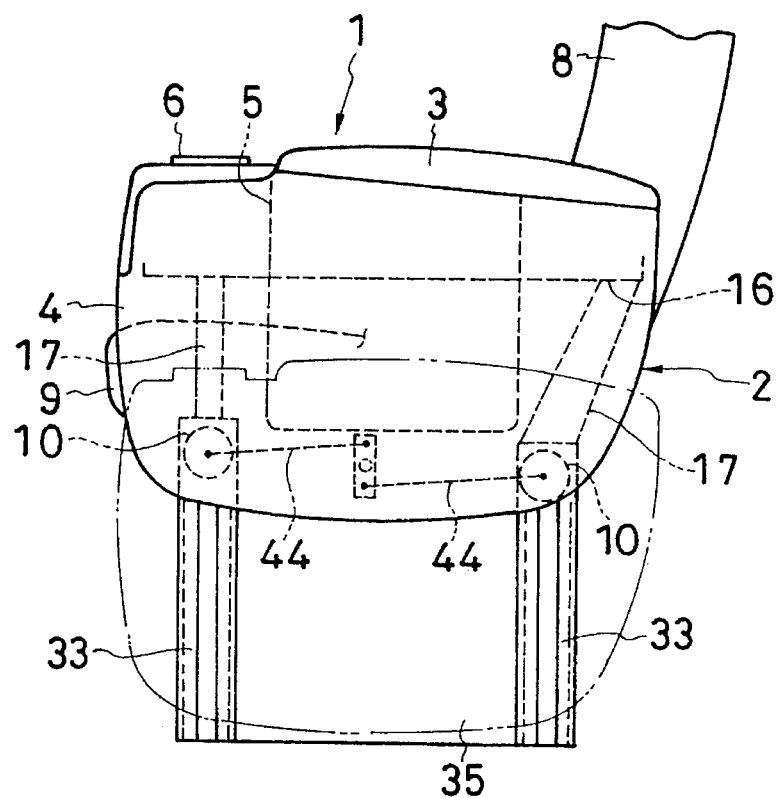
FIG. 12 is a side view showing main parts of FIG. 11.
Figure 13:
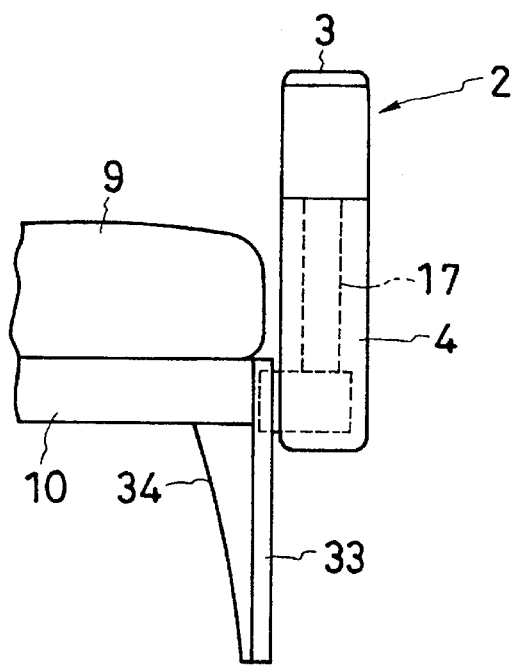
FIG. 13 is a front view showing main parts of FIG. 12.

FIGS. 8 to 10 show a modification of a locking mechanism 20, where in a locking screw 26 is used in place of the above-described sliding shaft 22. The locking screw 26 is mounted in such a manner as to be axially slidable with respect to a locking guide 27 formed on the lower end of the armrest 2 in the range of a specified stroke S1. Further, a male screw 26a is threaded at the leading edge of the locking screw 26 and a stopper 28 is formed on the inner end of the male screw 26a for preventing the fallout of the locking screw 26 to the surface side of the locking guide 27.

The stopper 28 prevents the further screwing of the male screw 26a of the locking screw 26 in such a state that the screw 26a is perfectly screwed with a female screw 29 formed on the base frame tube 10, and the reby functions to prevent the breakage of the locking guide 27 due to the excessive-fastening of the male screw 26a. A knob 30 is integrally formed on a head portion of the locking screw 26, that is, on the surface side of the locking guide 27. By suitable turning of the knob 30, the locking screw 26 can be fastened to and loosened from the female screw 29 on the base frame tube 10 side.

In addition, reference numeral 31 indicates an angle restricting plate substantially fan-shaped, which is fixed on a base frame (not shown) side of the seat. In the angle restricting plate 31, a circular-arc guide groove 31a is formed along the inner side of an outer peripheral circular-arc portion, and a pin 32 projecting from the armrest frame 16 side is inserted in the guide groove 31a. In the range of a formation length S2 of the guide groove 31a, the front side of the armrest 2 can be shifted in the vertical direction.

FIGS. 11 to 16 show a second embodiment of a seat for a disabled person. Parts corresponding to those in the first embodiment are indicated at the same symbols, and the explanation thereof is omitted.

In this embodiment, an armrest 2 is usually supported on the side end portion of base frame tubes 10 by a pair of stays 17 and 17 which are longitudinally fixed on the lower surface of an arm rest frame 16 forming the skeleton of the arm rest 2 in such a manner as to extend downward. At this time, the arm rest 2 is supported through rails 33 and 33 vertically fixed on the side end portions of the base frame tubes 10, and brackets 34 are fixedly provided between the rails 33 and 33 and the base frame tubes 10 to prevent the tilting of the rails 33 and 33. Further, a rail supporting plate 35 is interposed between both the rails 33 and 33 for accurately keeping the distance between the two rails 33 and 33 disposed oppositely to each other.

Figure 14:
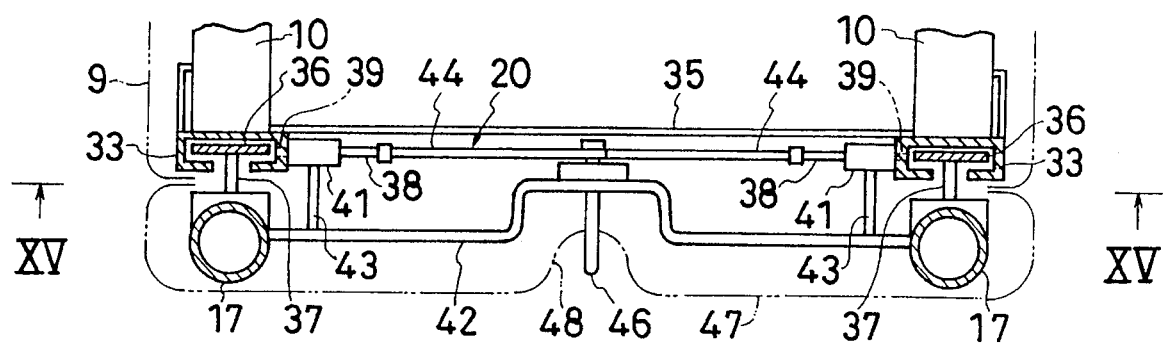
FIG. 14 is a sectional plan view of main parts of FIG. 11.
Figure 15:
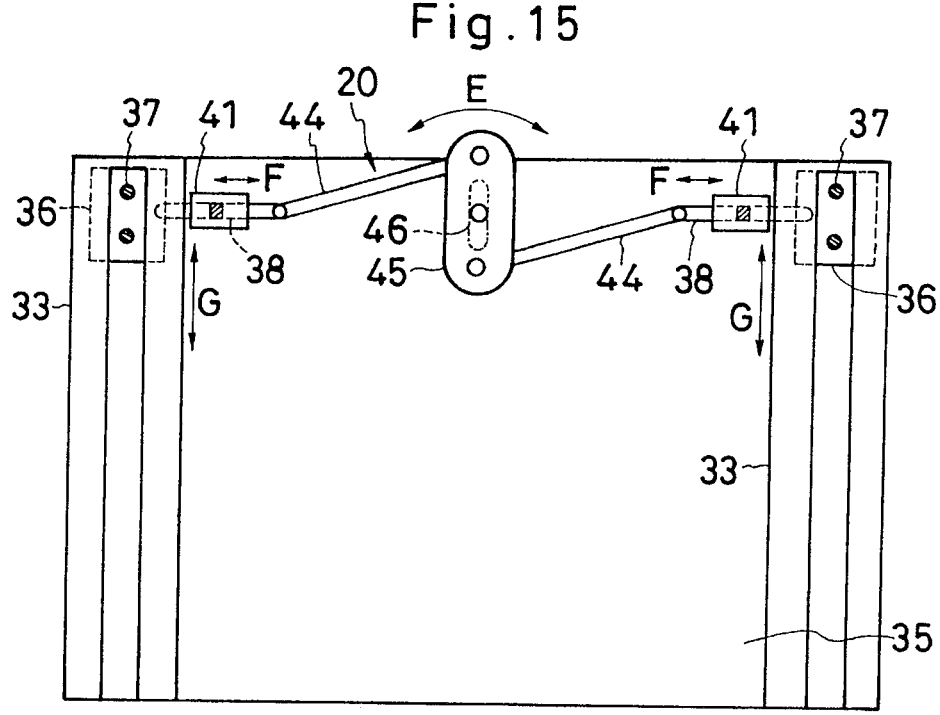
FIG. 15 is a sectional view taken along the line XV—XV of FIG. 14.
Figure 16:
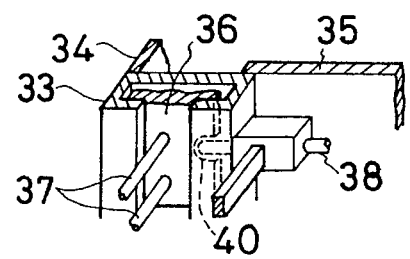
FIG. 16 is a perspective view of main parts showing a method of mounting sliders to rails.

Each of the rails 33 and 33 is substantially U-shaped in the cross-section (see FIG. 14), and a slider 36 is inserted in the rail 33 so as to be slidably moved in the vertical direction. The sliders 36 are fixed on the arm rest 2 side. Namely, the sliders 36 are each fixed at the stays 17 and 17 on the armrest 2 side by two supporting shafts 37 and 37 provided so as to correspond to opening portions formed on the side surfaces of the rails 33. As shown in FIGS. 14 and 15, a locking device 20 is formed at the uppermost ends of the rails 33 for locking the sliders 36 in such a state that the sliders 36 are positioned at the uppermost ends of the rails 33. The locking device 20 has such a mechanism as to insert lock pins 38 in the sliders 36 and the rails 33. Namely, each lock pin 38 passes through a though-hole 39 perforated on the rail 33, and further, the leading edge of the lock pin 38 is fitted in a recessed portion 40 formed on the slider 36 (see FIG. 16). Further, the locking pin 38 is supported by a pin guide 41 so as to be movable in the horizontal direction, and is fixed on a connecting lever 42 provided inside the armrest 2 by a supporting member 43. The connecting lever 42 is intended to connect the two stays 17 and 17 to each other.

A link 44 is turnably pin-connected at the other end of the locking pin 38. The other end of the link 44 is turnably pin-connected on the upper end or the lower end of a crank 45. The crank 45 is mounted at a substantially central portion of the connecting lever 42 in such a manner as to be turnable around the center portion of the crank 44 (in the direction of the arrow E). The crank 45 can be freely turned by a knob 46 formed on the crank 45. Namely, the knob 46 is fixed on the crank 45, and passes through a side panel 47 of the armrest 2 to be exposed to the outside. The exposed portion of the knob 46 lies in a recessed portion 48 formed on the side panel 47, to be thus easily held by the hand.

In the seat for a disabled person according to this embodiment, when the user such as a disabled person stops the wheelchair at the side of the seat to be sit on the seat, he firstly rotates the knob 45 clockwise to turn the crank 45 for removing the locking pins 38 from the recessed portions 40 of the sliders 36 and the though-holes 39 of the rails 33 through the link 44 (in the direction of the arrow F). With this action, the locking of the armrest 2 is released, which makes it possible to move the sliders 36 downward along the rails 33 (in the direction of the arrow G). In such a state, he pushes down the armrest 2, and moves the whole armrest 2 so as to sink it under the seat. At this time, the sliders 36 are slid downward within the rails 33 to descend the armrest 2. Further, the locking pins 38 are inserted in the pin guides 41, and the pin guides 41 are slid along the side surfaces of the rails 33 to be moved downward. As the armrest 2 is sufficiently sunk, the side surface 9a of the seat-bottom 9 can be sufficiently exposed from the upper portion of the armrest 2. Thus, the disabled person can move from the wheelchair to the seat and sit on the seat. The armrest 2 does not obstruct the above movement of the disabled person.

After completing the movement for the seating, the disabled person takes up the armrest 2 again, to return it to the normal service position, and rotates the knob 46 in the reversed direction. With this action, the leading edges of the locking pins 38 are fitted in the recessed portions 40 of the sliders 36 again to be thus engaged therewith. After the locking is performed in the above-described manner, the sliders 36 provided on the stays 17 of the armrest 2 are supported in the vicinity of the ends portions of the base frame tubes 10 of the seat through the rails 33.

Although the above embodiments have described the structure where the table 5 can be contained within the wing 4 of the armrest 2, the present invention can be applied to a simple armrest with no table 5, and may be of course carried out as suitable modifications within the scope of the object of the present invention.

As described above, in the seat for a disabled person according to the present invention, even for the armrest with the wing capable of containing the table, the side surface of the seat-bottom can be sufficiently exposed by moving downward the front end or the whole of the armrest, which enables the disabled person to easily sit on or separate from the seat from the side of the seat. Therefore, the extremely large effect can be obtained by carrying out the present invention.

POSSIBILITY OF EXPLOITATION IN INDUSTRY

A seat for a disabled person according to the present invention is characterized in that a horizontal shaft is provided on the rear portion of an armrest for enabling the turning of the front end of the armrest, thereby moving the front end portion or the whole of the armrest so as to sink it downward; and a locking device for suitably locking the armrest with respect to a seat frame and releasing the locking is provided. Accordingly, even in the case that the seat pitch is narrow and the armrest is of a type having a wing capable of containing a table just as in a business class seat of an airplane, a disabled person can easily sit on or separate from the seat by shifting the armrest to largely expose the surface of the seat-bottom. Further, the seat for a disabled person can be carried out as a seat with an armrest for various vehicles such as an airplane, ship and rolling stock, and as well as contribute to the social rehabilitation of disabled persons.

I claim:

1. A seat, comprising:

a frame;

a seat portion secured to said frame;

a backrest portion secured to said frame and extending upwardly from said seat portion;

an armrest;

support means for movably supporting said armrest on said frame such that said armrest is moveable from a first position for supporting a user's arm to a second position at which at least a forward end of said armrest is downwardly displaced to provide increased access to said seat portion, wherein said support means supports said armrest at at least two positions including a rear portion of said armrest and a forward position; and a table secured to said armrest and retractable into an opening provided in said armrest.

2. The seat of claim 1, wherein said support means comprises moving means for allowing said armrest to be translated downwardly.

3. The seat of claim 2, wherein said moving means comprises a pair of rails secured to said frame and a pair of sliders secured to said forward portion and said rear portion of said armrest and slidably received in said rails, respectively.

4. A seat, comprising:

a frame;

a seat portion secured to said frame;

a backrest portion secured to said frame and extending upwardly from said seat portion;

an armrest; and support means for movably supporting said armrest on said frame such that said armrest is moveable from a first position for supporting a user's arm to a second position at which at least a forward end of said armrest is downwardly displaced to provide increased access to said seat portion, wherein said support means supports said armrest at at least two positions including a rear portion of said armrest and a forward portion of said armrest when said armrest is in said first position, wherein said support means comprises:

pivot shaft secured to said frame and pivotably supporting said rear portion of said armrest such that said forward portion is pivotable downwardly so as to not obstruct access to said seat portion; and a locking device-disposed at said forward portion of said armrest for locking said armrest in said first position.

5. The seat of claim 4, wherein said locking device comprises a tubular member extending from said frame, a sleeve fixedly secured to said armrest and a retractable shaft slidably disposed in said sleeve, said shaft being moveable from a locked position, at which an end portion thereof is received in said tubular member to lock said armrest in said first position, to a second position, at which said end portion is disengaged from said tubular member to allow said armrest to be moved to said second position.

6. The seat of claim 4, wherein said locking device comprises a screw for fastening said forward portion of said armrest to said frame and a stopper for preventing said screw from becoming disengaged from a frame portion of said armrest.

7. The seat of claim 6, further comprising an angle restriction plate secured to said frame, said plate including an arcuate slot in which said screw is received for restricting angular movement of said armrest.

8. A seat, comprising:

a frame;

a seat portion secured to said frame;

a backrest portion secured to said frame and extending upwardly from said seat portion;

an armrest;

support means for movably supporting said armrest on said frame such that said armrest is moveable from a first position for supporting a user's arm to a second position at which at least a forward end of said armrest is downwardly displaced to provide increased access to said seat portion, wherein said support means supports said armrest at at least two positions including a rear portion of said armrest and a forward portion of said armrest when said armrest is in said first position, said support means including moving means for allowing said armrest to be translated downwardly, said moving means including a pair of rails secured to said frame and a pair of sliders secured to said forward portion and said rear portion of said armrest and slidably received in said rails, respectively; and locking means for locking said sliders to said rails when said armrest is in said first position.

9. The seat of claim 8, wherein said locking means comprises a pair of pins which are respectively insertable into holes in said rails and engageable with said sliders and a linkage for simultaneously axially moving said pins.

\* \* \* \* \*